United States Patent [19]

Hosoi et al.

[11] Patent Number: 5,565,990
[45] Date of Patent: Oct. 15, 1996

[54] COLOR TEMPERATURE METER FOR USE IN PHOTOGRAPHING

[75] Inventors: Norihisa Hosoi, Toyokawa; Seiki Yamaguchi, Toyohashi; Mikio Uematsu, Amagasaki; Yoshihiro Okui, Osaka, all of Japan

[73] Assignee: Minolta Camera Kabushiki Kaisha, Osaka, Japan

[21] Appl. No.: 18,381

[22] Filed: Feb. 17, 1993

[30] Foreign Application Priority Data

Feb. 17, 1992 [JP] Japan ................................. 4-069003

[51] Int. Cl.⁶ .................................................. G01J 3/50
[52] U.S. Cl. ........................ 356/406; 356/45; 356/404; 356/405
[58] Field of Search .......................... 356/406, 43–50, 356/407, 405; 358/29, 41, 909, 43, 45, 47

[56] References Cited

U.S. PATENT DOCUMENTS

| | | | |
|---|---|---|---|
| 4,291,979 | 9/1981 | Yuasa et al. | 356/218 |
| 4,389,118 | 6/1983 | Yuasa et al. | 356/406 |
| 4,655,576 | 4/1987 | Yuasa et al. | 354/415 |
| 4,773,761 | 9/1988 | Sugiyama et al. | 356/405 |
| 4,884,221 | 11/1989 | Sugiyama et al. | 364/526 |
| 4,909,633 | 3/1990 | Okui et al. | 356/405 |
| 4,989,982 | 2/1991 | Osaki et al. | 356/405 |
| 5,001,552 | 3/1991 | Okino | 358/41 |
| 5,048,955 | 9/1991 | Bernhard | 356/213 |
| 5,168,155 | 12/1992 | Arima et al. | 356/405 |

FOREIGN PATENT DOCUMENTS 53-51749  12/1978  Japan .

*Primary Examiner*—Robert P. Limanek
*Assistant Examiner*—David B. Hardy
*Attorney, Agent, or Firm*—Burns, Doane, Swecker & Mathis, LLP

[57] ABSTRACT

A photographic color temperature meter capable of measuring light including stationary light and flash light. The meter controls timing of light measurements so that light measurement is performed during the time when stationary light and flash light are included and when only stationary light is included. Thereafter, calculation of color temperature only of flash light is performed.

13 Claims, 14 Drawing Sheets

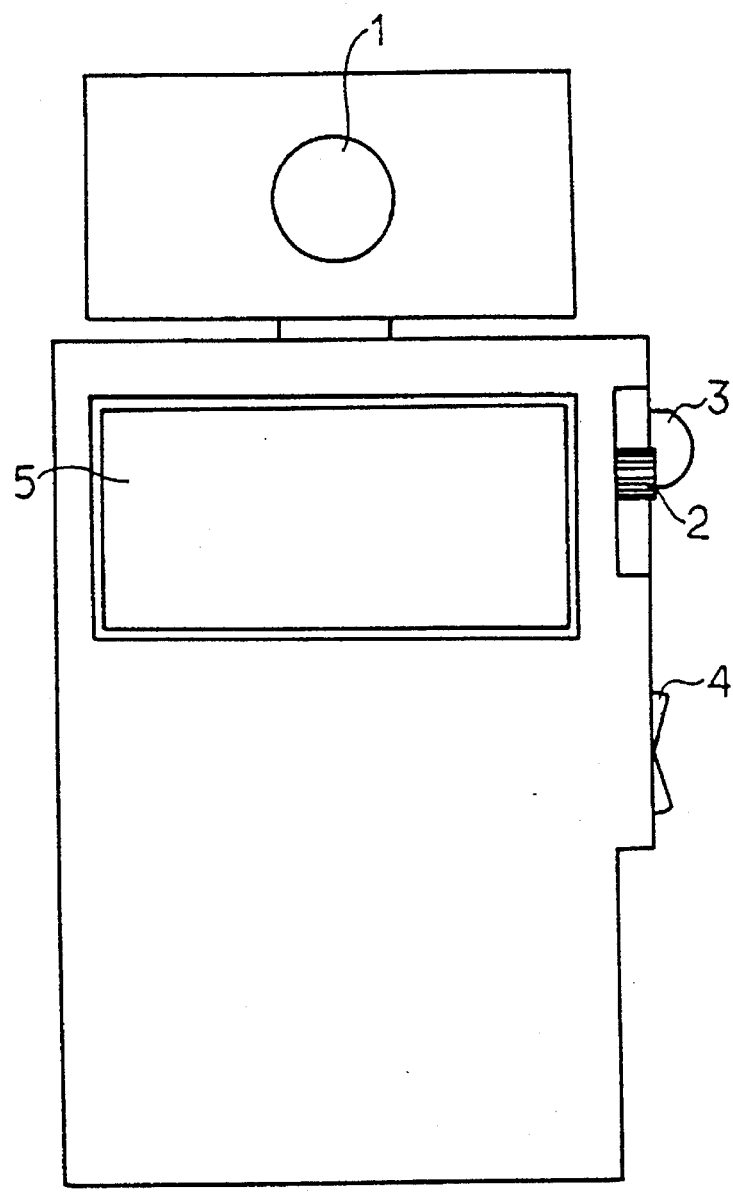
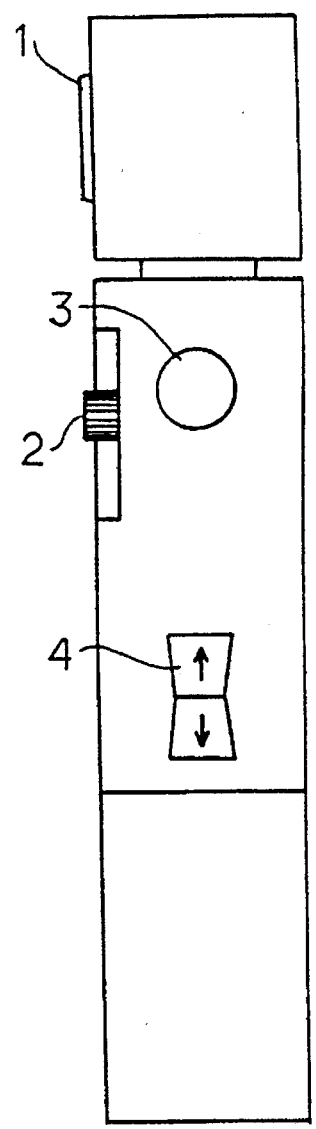
Fig. 1 (a)
Fig. 1 (b)

COLOR TEMPERATURE METER FOR USE IN PHOTOGRAPHING

BACKGROUND OF THE INVENTION

The present invention relates to a photographic color temperature meter for measuring color temperature of a flash light used for phototaking.

Conventionally photographic film is arranged to reproduce proper colors when a photographing operation is carried out using a light source specified according to the film characteristic. For example, a film of type D reproduces proper colors when photographing in daylight whose color temperature is 5500 K., and a film of type A reproduces proper colors when photographing in a tungsten light whose color temperature is 3200 K. In other words, the color temperature of a light source for photographing should be kept as close as possible to that of the light source specified according to the film in use. Accordingly, in case the former temperature differs from the latter, it is necessary to correct colors by using a filter and the like, unless a photographer has a particular intention in phototaking.

In case the color temperature of the light source used for photographing is unstable, the photographer has to measure the color temperature and correct colors each time a photographing operation takes place. Therefore, the color temperature should be kept as constant as possible in a stable condition. In most photographing studios and the like, the color temperature is kept constant by means of periodical measurement of each light source. Further, the photographer often measures the color temperature of the light source for confirmation before starting photographing.

In conventional photographic color temperature meters capable of measuring flash light, in case of measuring flash light, it is unavoidable that stationary light such as ambient daylight is taken in together with the flash light. Hence, the light measurement result is Inevitably affected by the stationary light. Therefore, in the case of performing color temperature light measurement regarding only the flash light, it has been required to measure light after cutting off all light except for the light from a flash light source, by turning an ambience completely dark Just before the flash light measurement.

However, the light measurement of a flash light source was a most troublesome operation, because it reduces the operational efficiency of light measurement to turn the ambience completely dark every time photographing is performed. Further, in case of photographing at a place such as outside where stationary light can not be taken away easily, it was very difficult to measure the color temperature only of flash light. In the conventional photographic exposure meter, an aperture value for setting an exposure is obtained by means of a separate light measurement, i.e., by separating a flash light component and a stationary light component. However, the meter cannot output color temperature data solely based on the flash light with use of plural light receiving units whose one spectral sensitivity is different from another.

SUMMARY OF THE INVENTION

The present invention is to solve the above mentioned problem, and an object of the present invention is to provide a photographic color temperature meter capable of obtaining color temperature data based solely on a flash light, without being affected by stationary light, by making a flash light emit under illumination of stationary light so as to perform light measurement without erasing the stationary component of an ambience. According to the present invention, the troublesome arrangement, turning the surroundings completely dark before a phototaking operation for cutting off all light other than from flash source, is avoidable.

In order to achieve the above object, a color temperature meter according to the present invention comprises: plural light receiving units having different spectral sensitivity for receiving light to be measured; light measurement means for obtaining light measurement data from each of the light receiving units during the time period when stationary light and flash light are both included and during the time period when only flash light is included; flash light calculating means for calculating data corresponding to the flash light based on the measured data obtained by the light measurement means; color temperature calculating means for calculating color temperature regarding only the flash light based on the data obtained by the flash light calculating means and output means for outputting color temperature data obtained by the color temperature calculating means.

BRIEF DESCRIPTION OF THE DRAWINGS

FIGS. 1a and 1b show a front view and a side view of a photographic color temperature meter according to the first embodiment of the present invention.

DETAILED DESCRIPTION OF THE PREFERRED EMBODIMENTS

Figure 2:
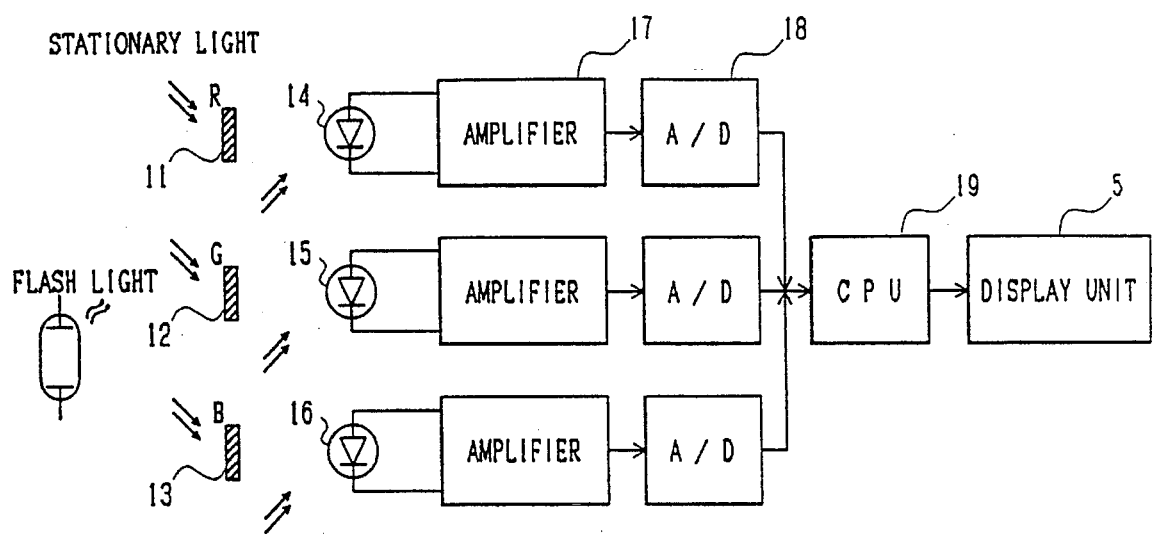
FIG. 2 is a brief block chart of the photographic color temperature meter.

An embodiment of the present invention will now be described with reference to the accompanying drawings.

FIGS. 1a and 1b are front and side views of a photographic color temperature meter according to the first embodiment. The present photographic color temperature meter has a light receiving surface 1 for receiving light to be measured; a light measurement mode change-over switch 2 for selecting a mode to measure flash light; a light measurement button 3 for controlling light measurement by means of an output of a trigger signal for flash light emission when flash is connected and setting a state of waiting for an emission of the flash light when flash is not connected; an up/down key 4 for setting exposure time and a display section 5 for displaying color temperature data, the exposure time and the like. There are two modes, CORD mode and NON.C mode, as a mode to measure flash light selected by the light measurement mode change-over switch 2. The CORD mode is a mode to synchronize flash light emission with light measurement by outputting the trigger signal for flash light emission upon the start of light measurement from the photographic color temperature meter. On the other hand, NON.C mode is a mode wherein upon the emission of flash light under the flash light emission waiting state made by depressing the light measurement button 8, the photographic color temperature meter detects automatically the emission of flash light and starts light measurement, and thereby flash light emission and light measurement are synchronized. The difference between CORD mode and NON.C mode does not relate to the present invention, wherein explained is the case that NON.C mode is selected by the light measurement mode change-over switch 2.

FIG. 2 is a brief block chart of the photographic color temperature meter, which has filters 11, 12 and 13 respective of red, green and blue for transmitting only red, green and blue component of the measured light (referred to as R, G and B hereinafter). A photo sensor 14, 15 and 16, each of which being a light receiving section, is disposed in a rear of each filter 11, 12 and 13. Each photo sensor 14, 15 and 16 receives only R,G,B component of the measured light which is transmitted through each filter 11, 12 and 13. The photographic color temperature meter further comprises an amplifier 17 for amplifying signals generated from photo sensor 14, 15 and 16, an A/D (analogue-to-digital) converter 18 for converting this amplified signal to a digital data, a CPU (central processing unit) 19 which is calculate means for calculating and obtaining color temperature only of the flash light based on various kinds of light measurement data and a display section 5 which is output means for outputting color temperature data.

Figure 3:
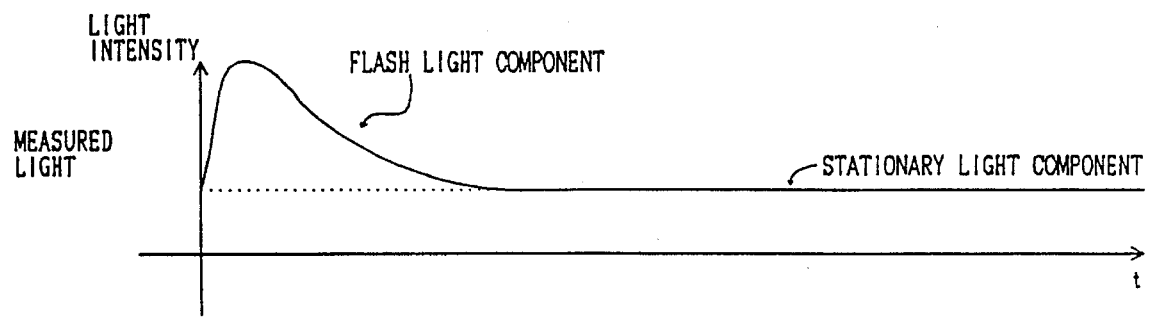
FIG. 3 is a time chart showing intensity of measured light.
Figure 4:
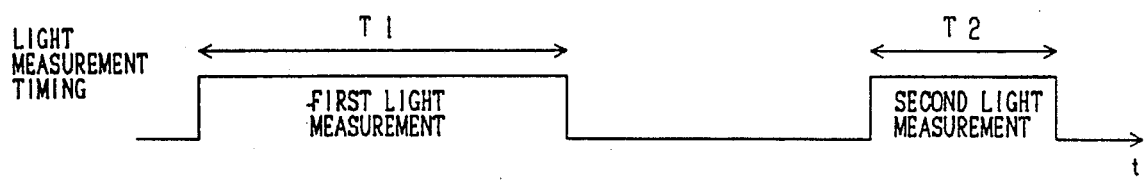
FIG. 4 is a time chart showing the time period when light measurement is performed.
Figure 5:
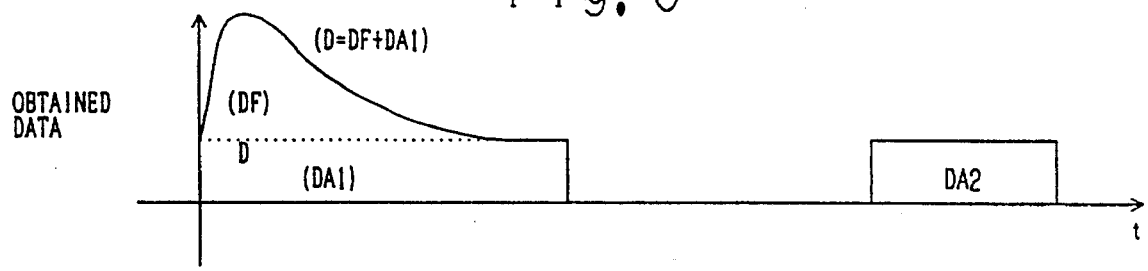
FIG. 5 is a time chart showing data obtained by light measurement.

The principal of the light measurement will be explained next with reference to Figs. from 2 to 5. FIG. 3 is a time chart showing an intensity of measured light. FIG. 4 is a time chart showing timing of light measurement. FIG. 5 is a time chart showing data obtained by light measurement. A first light measurement is started on the emission of flash light and finished after T1 time. During the light measurement, only R, G and B component of the measured light transmitted through each of filter 11, 12 and 13 is received at the photo sensor 14, 15 and 16. Then, a signal respective corresponding to R, G and B component of the measured light is amplified at the amplifier 17 and inputted to the A/D converter 18 and converted to a digital data. And then, a digital data corresponding to R, G and B component of the measured light is outputted from the A/D converter 18 and inputted to the CPU 19.

At the first light measurement performed in the light measurement time T1 (thereto a set up exposure time is inputted), a light measurement data D (DR, DG and DB) corresponding to the sum of flash light component amount and stationary light component amount, i.e., total light amount of the measured light is obtained and inputted to the CPU 19 to be memorized. After the elapse of period T1 from the emission of flash light, the first light measurement has been finished. And then the second light measurement is started automatically after a predetermined period. This predetermined time period, i.e., an interval between the first and second light measurement is previously set that flash light emission has been finished at a starting time of the second light measurement, so that light measurement of only stationary light can be achieved without receiving an affection of flash light at the second light measurement, and the time period is to be such a short period as unrecognizable to the operator.

The second stationary light measurement is carried out for a previously set time T2. The signal corresponding to R, G and B component of the measured light generated from the photo sensor 14, 15 and 16 is processed similarly to that of the first light measurement, converted into a digital data corresponding to R, G and B component of the measured light and inputted to the CPU 19. At the second light measurement, light measurement data DA2 (DA2R, DA2G, DA2B) corresponding only to the stationary light component amount is obtained and inputted to the CPU 19 to be memorized. In FIG. 4, a point in time to start the second light measurement changes due to the change of exposure time, since the second light measurement is performed after the predetermined time has elapsed from the end of the first light measurement.

The second light measurement having been finished, in the CPU 19, a digital data DF only of the flash light corresponding to each component is obtained from below mentioned equations (1)(3), based on the light measurement data D and DA2 obtained by means of light measurement, with use of the fact that the exposure amount of the stationary light changes in proportion to the exposure time.

$$DFR = DR - (T1/T2) \times DA2R \quad (1)$$

$$DFG = DG - (T1/T2) \times DA2G \quad (2)$$

$$DFB = DB - (T1/T2) \times DA2B \quad (3)$$

The CPU 19 calculates color temperature only of flash light component, based on data ratio of R,G and B component of digital data DF (DFR, DRG and DFB) only of flash light, which is obtained as above stated and corresponding to each component, and makes the color temperature data to be inputted to the display section 5 for displaying. The operator, watching this output result, is notified of the color temperature only of the flash light, which is not affected by stationary light.

Meanwhile, it is assumed that a mode to calculate and display the color temperature based only on the flash light component of the measured light is F mode and that the case to the contrary is an ordinary light measurement mode whose exposure time can be set selectively from 1/1 to 1/500. And then, this F mode is incorporated as one of alternatives of set exposure time by using UP/DOWN key 4. In the present embodiment F mode is disposed in particular at one of both ends of a series of choices for the exposure time. That is, F mode is represented by "F", and disposed as follows:

F-1/1-1/2-1/4-1/8-1/15-1/30-1/60-1/125-1/250-1/500 otherwise,

1/1-1/2-1/4-1/8-1/15-1/30-1/60-1/125-1/250-1/500-F

Since F mode is a mode for outputting the color temperature only of flash light component containing no stationary light component, not related to the normal light measurement mode, disposing F mode outside of the choices for the exposure time facilitates an handling of operator. Especially, the latter, wherein F mode is disposed next to "1/500" is the more suitable, since it is easily associated with a thought that the stationary light component is infinitely decreased by shortening the exposure time infinitely. Meanwhile, In F mode, a predetermined fixed value is inputted to the light measurement time T1.

Explanation is next given to color reproduction of film in case of taking a photograph using both of flash light and stationary light as a light source, wherein a color of light composed of both lights affects color reproduction of film. An exposure light amount changes in proportion to an exposure time, however, a time period of flash light emission is remarkably shorter than the exposure time, the exposure amount of flash light is fixed irrespective of exposure time. Accordingly, color temperature of the composed light changes corresponding to the exposure time, and the color reproduction of film becomes different if the exposure time is different, even if photographing with the use of flash light source and stationary light similarly. Therefore, in case of photographing while changing exposure time, a color of light source has to be measured every time the exposure time is changed, causing a deterioration of operational efficiency.

Then, in the photographic color temperature meter, color temperature of a light source which changes due to above mentioned change of exposure time is obtained by calculation. That is, after light measurement is finished, total light amount D2 (D2R, D2G, D2B) composed of flash light and stationary light at exposure time T3 changeable arbitrarily after light measurement is calculated by the following (4)–(6) equations from the light measurement data D (DR, DG, DB) on sum of flash light component and stationary light component, obtained from light measurement for time T1, and the light measurement data DA2 (DA2R, DA2G, DA2B) solely on the stationary component, obtained from light measurement for time T2.

$$D2R = DR - (T1/T2) \times DA2R + (T3/T2) \times DA2R \quad (4)$$

$$D2G = DG - (T1/T2) \times DA2G + (T3/T2) \times DA2G \quad (5)$$

$$D2B = DB - (T1/T2) \times DA2B + (T3/T2) \times DA2B \quad (6)$$

Further, color temperature is calculated based on a ratio of R, G and B component of calculated D2 (D2R, D2G, D2B) and displayed on a display section 5. Thus, correct color temperature data is obtained without performing light measurement again, even in case of photographing with exposure time changed.

Figure 6:
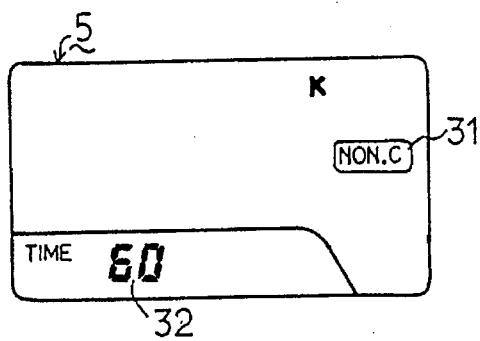
FIGS. 6a–6f are views showing display contents of a display section of the photographic color temperature meter.
Figure 6:
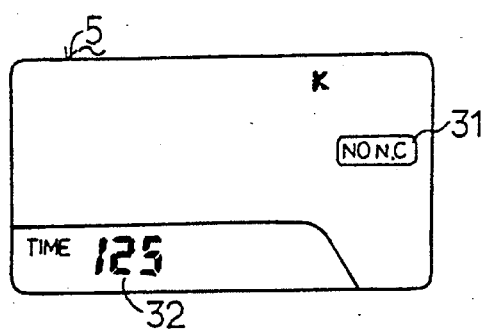
Figure 6:
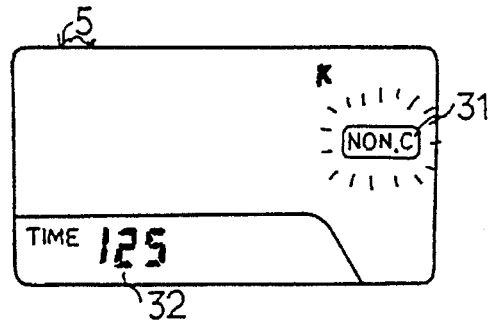
Figure 6:
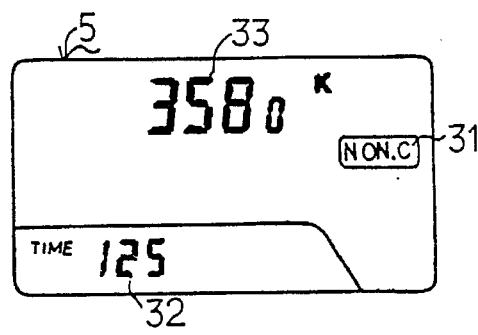
Figure 6:
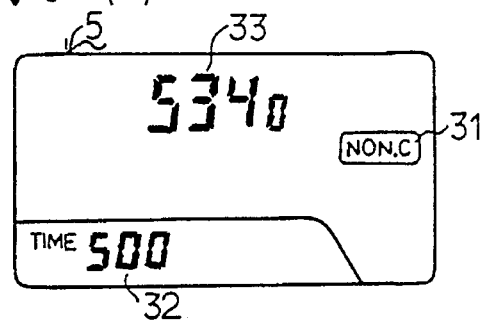
Figure 6:
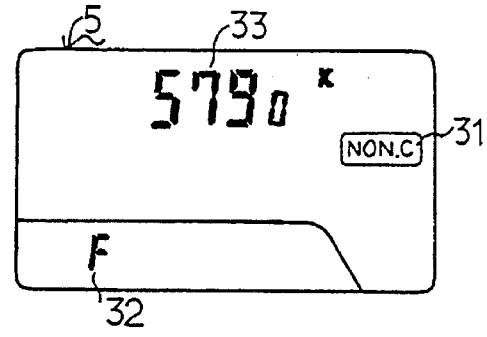
Figure 7:
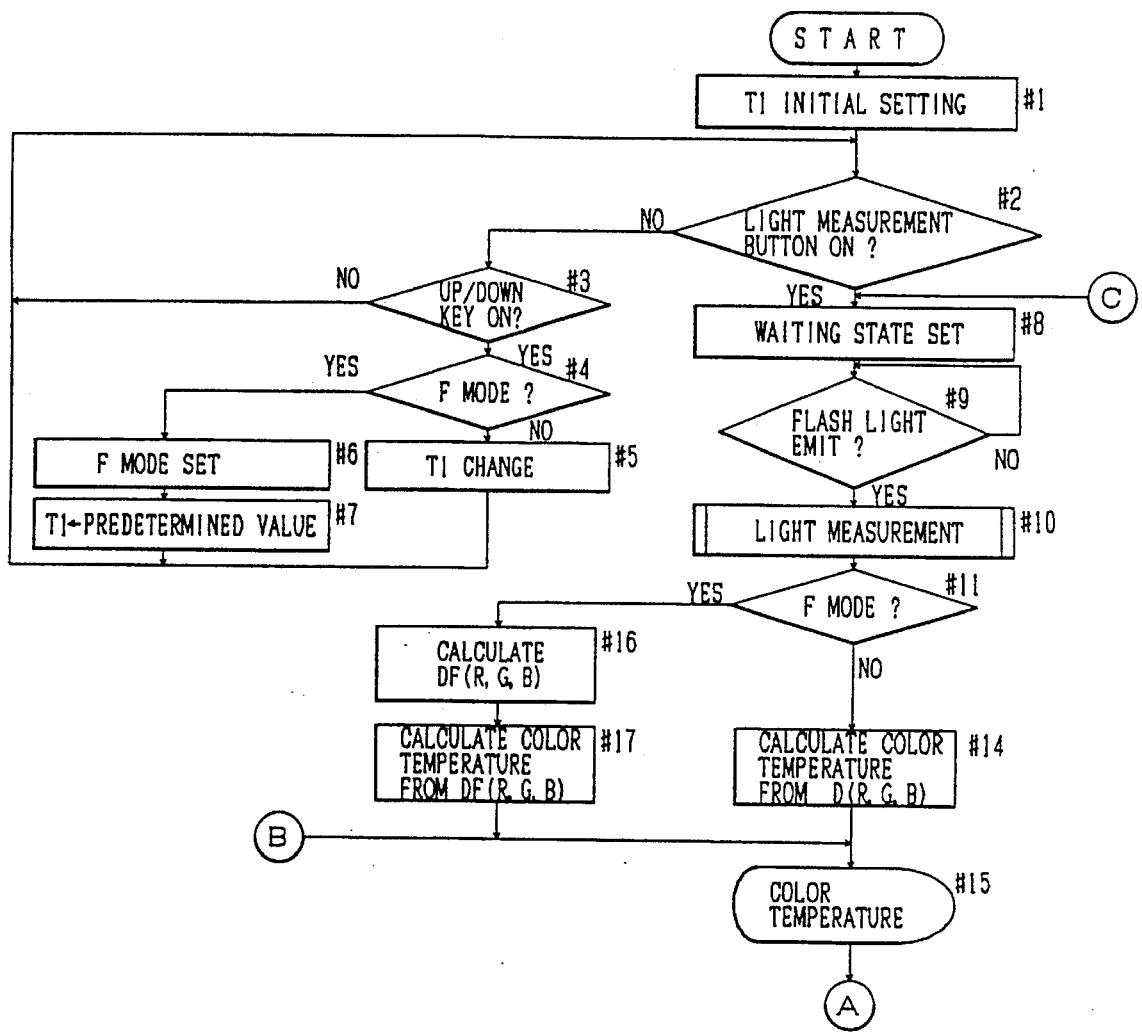
FIG. 7 is a flow chart showing an operational order of the photographic color temperature meter.
Figure 8:
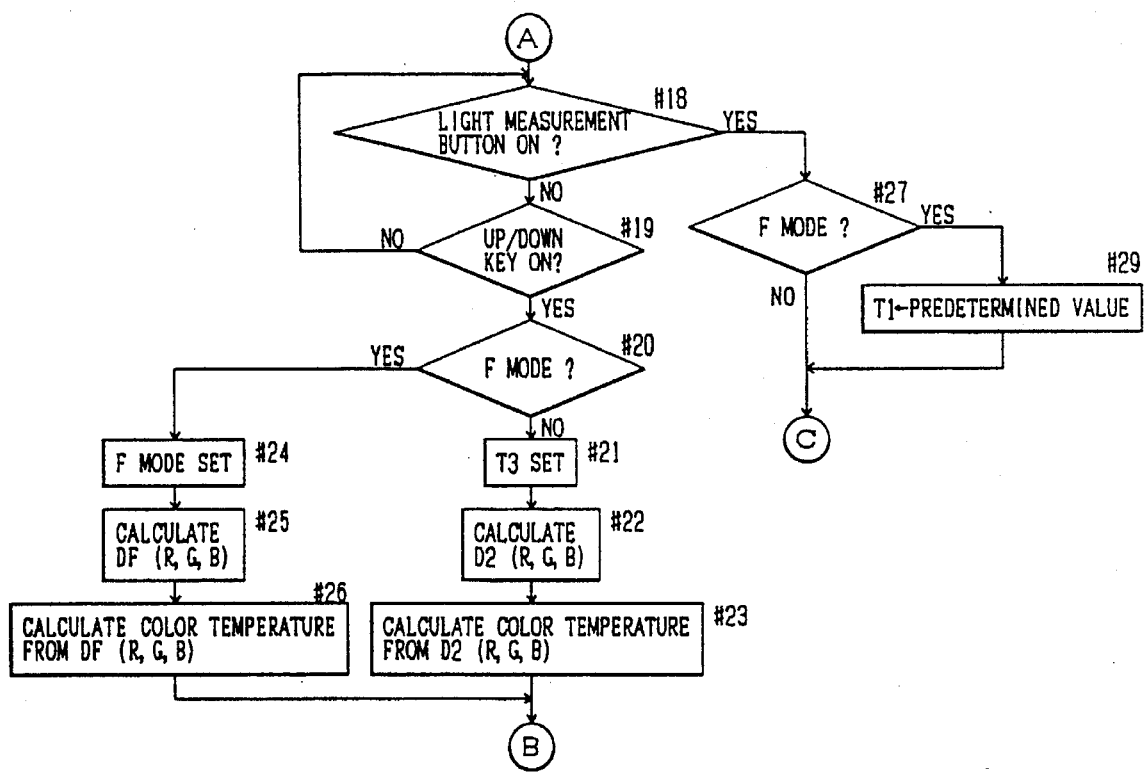
FIG. 8 is a flow chart showing an operational procedure of the photographic color temperature meter.

Then, an operational procedures of the photographic color temperature meter is explained with reference to FIGS. 6 to 9. FIG. 6(a) to (f) shows contents displayed on the display section 5, FIGS. 7 to 8 is a flow chart showing operational procedures of the color temperature meter. Initially, a light measurement mode change over switch 2 is set to NON.C mode. On the display section 5, as shown in FIG. 6(a), a character of NON.C which indicates that NON.C mode is set is displayed at right upper portion 31. At the same time, the exposure time T1 is initialized (#1), and the exposure time T1, 60 representative of 1/60 is displayed in this case at left lower portion 32.

Here, it is possible to change the exposure time T1 before depressing light measurement button 3 (NO at #2), i.e., before light measurement by using the UP/DOWN key 4. When the UP/DOWN key 4 is depressed (YES at #3), whether it is F mode or not is Judged. In case that it is not F mode (NO at #4), the exposure time T1 is changed into a set exposure time by using the UP/DOWN key 4 (#5). Namely, as shown in FIG. 6(b), an operator sets the exposure time T1 a desired value with use of the UP/DOWN key 4, 125 representative of 1/125 in this case, while watching the exposure time indicated at the left lower portion 32. In case F mode is selected by the UP/DOWN key 4 (YES at #4), F mode is set (#6), an exposure time indication at lower left portion 32 on the display unit 5 becomes "F", and the exposure time T1 is set to a predetermined time previously determined (#7). This change of setting of the exposure time T1 can be performed repeatedly till the light measurement button 3 is depressed (YES at #2).

When the light measurement button 3 is depressed (YES at #2), the photographic color temperature meter is entered in a state waiting for a flash light emission (#8), and NON.C display at the right upper portion 31 on the display unit 5 blinks to indicate that it is entered in the state waiting for a flash light emission, as shown in FIG. 6(c). If flash light is not emitted under this waiting state (NO at #9), this state is retained as it is. If the flash light is emitted under this waiting state (YES at #9), the photographic color temperature meter detects the flash light emission and starts light measurement automatically (#10).

Figure 9:
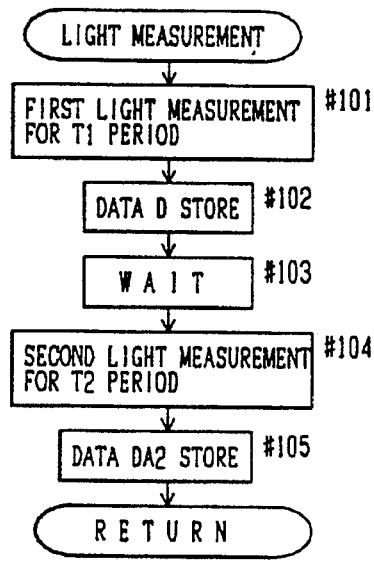
FIG. 9 is a flow chart showing details of a light measurement process of the photographic temperature meter.

Then, details of the light measurement processing is explained with reference to a flow chart in FIG. 9. As explained in the above described principal of light measurement, in the first light measurement, total value of flash light and ambient stationary light is measured for a light measurement time T1 (#101), and the digital data D (DR, DG, DB) corresponding to the sum of flash light component and stationary light component is stored (#102). After waiting for a predetermined time previously determined (#103), only stationary light is measured for light measurement time T2 in the second light measurement (#104), and the digital data DA2 (DA2R, DA2G, DA2B) corresponding solely to the stationary light component is stored. The light measurement processing is finished in this way (# 105).

Now returning to the FIG. 7, the processing after the light measurement processing is explained. Whether F mode or not is judged, and in case it is not F mode (NO at #11), color temperature is calculated (#14) based on the ratio of R, G, B component of the obtained digital data D (DR, DG, DB), and color temperature 3580 k is indicated (#15) at upper portion 33 of the display unit 5 as shown in FIG. 6(d). Also, the light measurement having been finished, in case of F mode (YES at #11), a digital data DF (DFR, DFG, DFB) only of the flash light is calculated by the beforementioned (1)–(3) equations (#16). The color temperature is obtained (#17) by calculation based on the ratio of R, G, B component of the obtained digital data DF (DFR, DFG, DFB) and indicated at the upper portion 33 of the display unit 5.

Here, explanation is given to the difference between the F mode and a normal light measurement mode. The light measurement time of the two modes in the light measurement processing at #10 differs as follows. The light measurement time of the first light measurement for measuring flash light in the normal light measurement mode is, as beforementioned, determined by the exposure time T1 which is indicated prior to light measurement. In contrast, the light measurement time of the first light measurement in case of measuring light In F mode is made to be a predetermined time determined previously.

After the processing of color temperature data indication (#15), in a flowchart in FIG. 8, whether the light measurement button 3 is depressed or not (#18) and whether the UP/DOWN key 4 is depressed or not (#19) is Judged. In case that the UP/DOWN key is depressed (YES at #19) without the light measurement button 3 being depressed (NO at #18), the process advances to #20 and checks setting of F mode (# 20). If the normal light measurement mode is set instead of F mode (NO at #20), the setting of exposure time T3 is changed (# 21). This is similar to the beforementioned case that the setting of exposure time T1 is changed at #5. Consequently, total light amount data D2 (D2R, D2G, D2B) of flash light and stationary light corresponding to the newly set exposure time T3 is calculated by using the equations (4)–(6) at #22 and #23, and color temperature is calculated and obtained based on the ratio of R, G, B component of the obtained digital data D2 (D2R, D2G, D2B), and then the process returns to #15 and obtained data is indicated.

On the other hand, if being F mode (YES at #20), F mode is set (#24) and then, digital data DF (DFR, DFG, DFB) corresponding only to flash light component is calculated, and color temperature by only flash light component based on R, G and B component in the digital data DF, and then the process returns to #15, and obtained data is indicated. The color temperature data indicated here is the color temperature only of flash light without affected by the stationary light component at all. The processing here #25 and #26 is similar to the processing at #16 and #17.

An example of indication according to the above processing is as follows: in case the exposure time is changed from 1/125 to 500, as shown in FIG. 6(e), 500 representative of 1/500 of the exposure time T3 is indicated at the lower left portion 32 of the display unit 5, and at the same time color temperature 5340 k is indicated at the upper portion of the display unit 5. That is, in this case, with the use of the light measurement data measured at the exposure time 1/125, a composite color temperature 5340 k composed of flash light and stationary light, which should be obtained in case of light measurement at exposure time 1/500, is obtained through calculation and indicated without actually performing light measurement. On the other hand, in case of F mode, as shown in FIG. 6(f), when indication of exposure time at lower left portion 32 of the display unit 5 becomes "F", also, color temperature 5790 K. is indicated at the upper portion 33 on the display unit 5. Meanwhile, after the color temperature data indication (#15), while the light measurement button 3 as well as UP/DOWN key 4 remains not depressed (NO at #18 as well as at #19), the color temperature data at step #15 continued to be indicated.

Then, explanation is given to the processing in case that the light measurement button 3 is depressed again (YES at #18) after the color temperature data indication (#15). If not being F mode (NO at #27) in this case, the process returns to #8, the photographic color temperature meter enters in the state waiting for flash light emission. On the other hand, in case of F mode (YES at #27), light measurement time T1 for next light measurement is regarded as a predetermined value determined previously (#29), the process returns to #8, and the meter enters in the light emission waiting state similarly to the above.

Although the color temperature meter according to the above described first embodiment calculates color temperature by receiving three colors red, green and blue, in the light measurement, there is no necessity for receiving all of three colors. For instance, it is possible to receive only two colors of red and blue and calculate color temperature based on the light measurement result. Like a spectral type measuring apparatus, it may be possible for a color temperature meter capable of receiving light with many wavelengths to obtain a spectral characteristic of the measured light and calculate color temperature from the data. Also, as a value to be calculated and indicated other than color temperature, a value representative of the correction amount of a filter for correcting the difference between color temperature of the light source specified according to the film characteristic and that of measured light, e.g., LB mired value, CC density value is calculated preferably.

Further, the indicated contents of the photographic color temperature meter may be changed into the color temperature of the measured light or a value of the correction amount of the filter, by using a display change over key. Even If using no UP/DOWN key, it is possible to prepare a key only for entering the F mode, though a method for setting the F mode with use of an UP/DOWN key is explained previously.

Explanation is next given to a second embodiment of the present invention, wherein described is a photographic color temperature meter provided with a function for correcting LB, CC value. Even in case of photographing with the light source as specified in accordance with film characteristic, color reproduction often differs due to difference of the kind of film, also, a film of a different lot in manufacturing even if the film is the same kind. In such cases, for example, if using a filter corresponding to a value obtained by shifting from measured and indicated LB, CC value by a specific value learned by experience, proper colors are reproduced. Also, the photographer sometimes uses the LB, CC filter with shifted value intentionally for the purpose of original effect, instead of using LB, CC filter corresponding to LB, CC value indicated by the photographic temperature meter. In this case, it is convenient if the LB, CC measured value of the photographic color temperature meter can be corrected, since the measurement indicated value can be read directly for selecting film. In an apparatus according to the second embodiment, it is arranged that plural correction values for correcting LB, CC value can be inputted and the indicated LB, CC value is corrected in accordance with the correction value upon the input of correction value.

Figure 10:
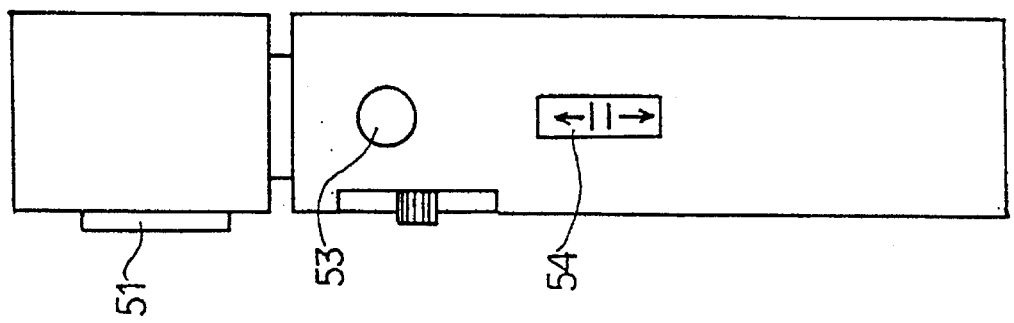
FIGS. 10a–10c show a front view and right and left side views of a photographic color temperature meter according to the second embodiment of the present invention.
Figure 10:
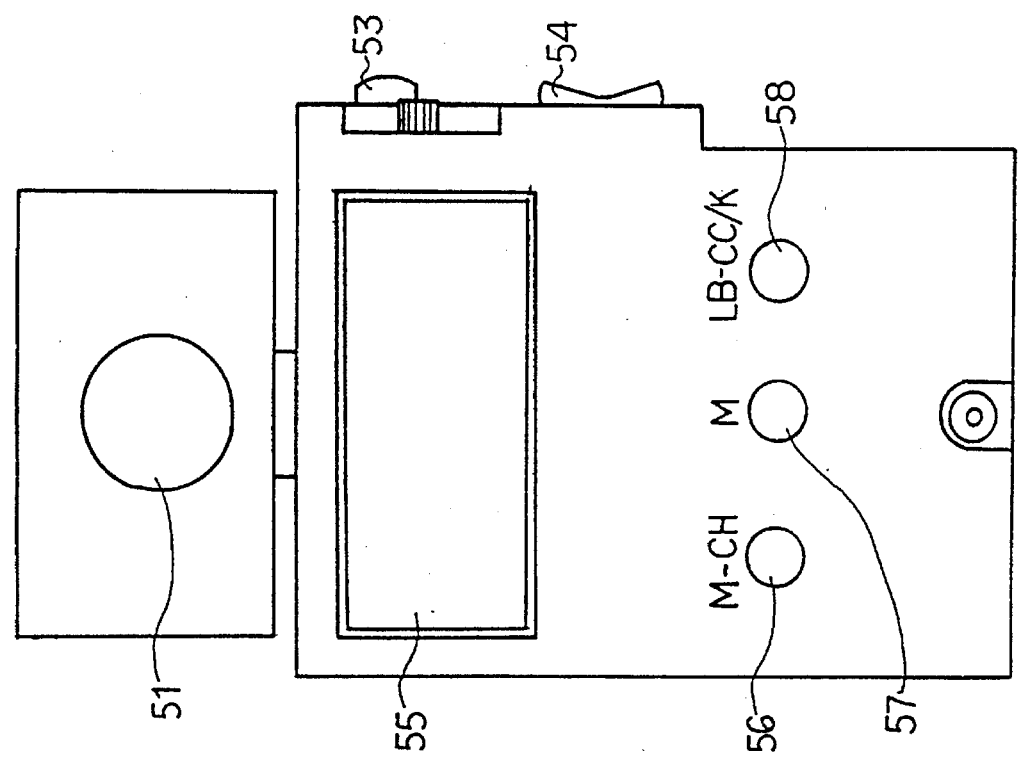
Figure 10:
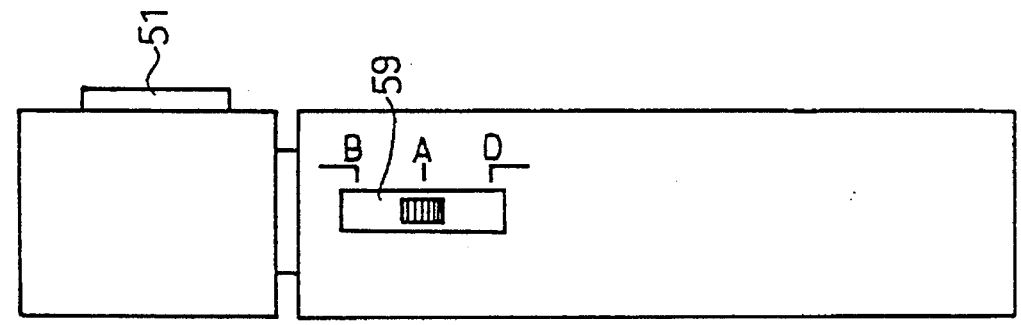

FIGS. 10a–10c are a front view and a left and right side view of the photographic color temperature meter according to the second embodiment, which embodies light receiving surface 51 for receiving measured light, light measurement mode change over switch 52, light measurement button 53 for starting light measurement, an UP/DOWN key 54 for changing LB correction value and CC correction value, a display unit 55 for indicating LB value and CC value, a memory channel change over key 56 for setting a memory channel selecting mode, a memory key 57 for setting a LB correction value and CC correction value changing mode, a display mode change over key 58 and a film setting switch 59 and the like. As described in the above, this display mode change over key 58 is a key for changing the contents indicated on the display unit 55 into the color temperature of measured light or the value of correction amount of filter.

As the above mentioned correction value, LB is inputted by a mired value, and CC is inputted by a density value (effective density×100). When the correction value is represented by $\Delta$ LB and $\Delta$ CC, and the measured value is represented by LB and CC, display value of the photographic color temperature meter is expressed as follows:

$$\text{display value of LB} = \text{LB} + \Delta \text{LB}$$

$$\text{display value of CC} = \text{CC} + \Delta \text{CC}$$

Further, by preparing plural pairs of correction value $\Delta$ LB and $\Delta$ CC, it becomes possible to use proper pair of correction value Δ LB and Δ CC in accordance with various photographic conditions such as a film to be used, place of photographing and an object. Explanation will be given hereinafter assuming that 4 pairs of correction value Δ LB and Δ CC are settable. A memory channel is set from 1 to 4 corresponding to these pairs of correction value Δ LB and Δ CC. A memory channel 0 is a region where correction value is always set Δ LB=0 and Δ CC=0, for which the operator does not set correction value. Memory channels 1–4 are a region wherein the operator can set the correction value Δ LB and Δ CC.

Figure 11:
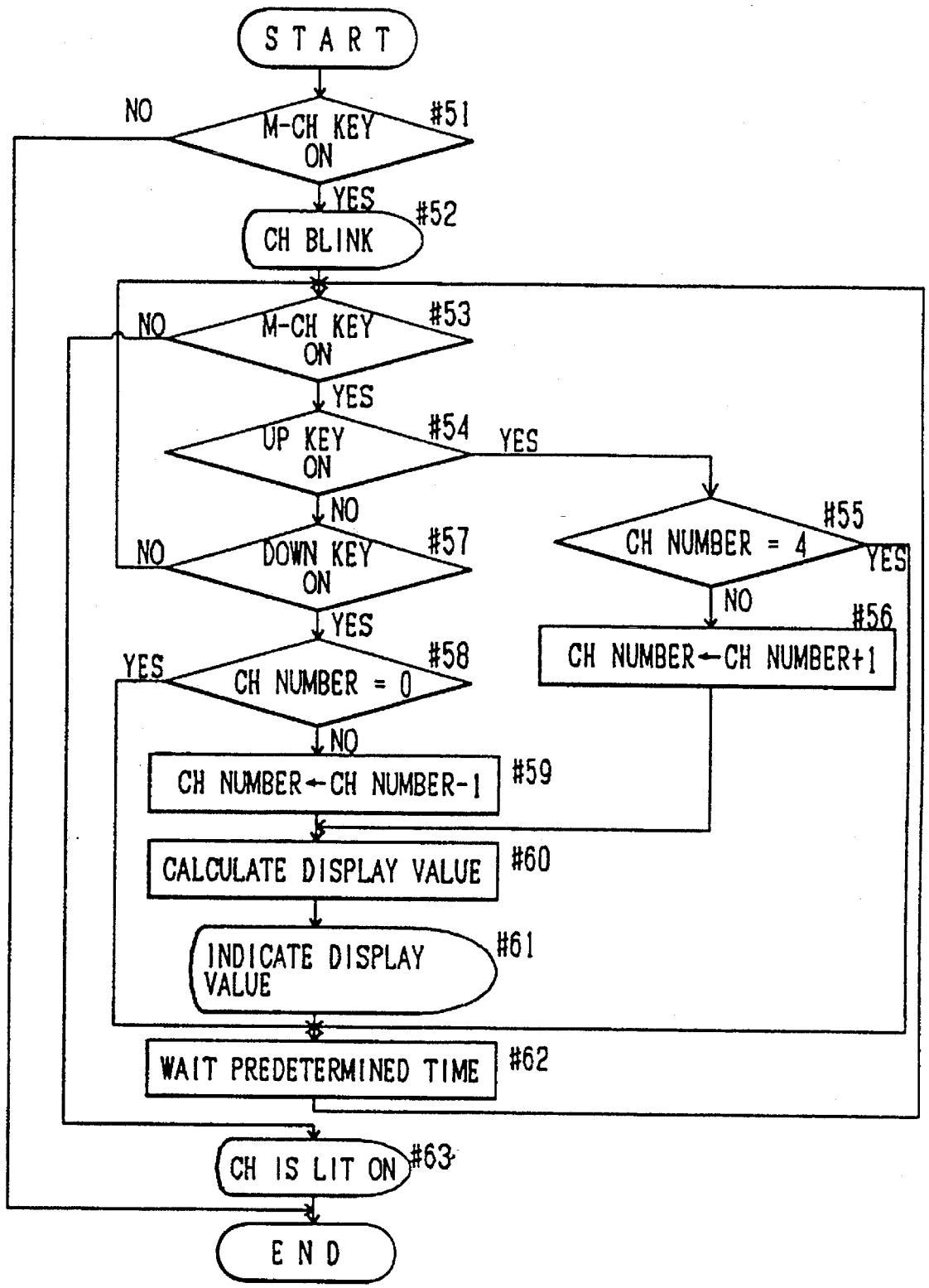
FIG. 11 is a flow chart showing a procedure of selecting a memory channel.
Figure 12:
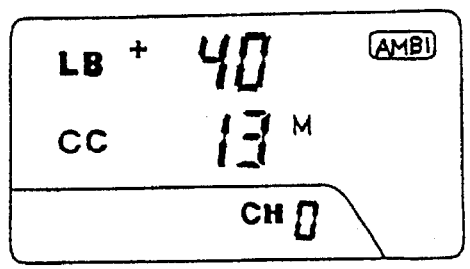
FIGS. 12a–12e are views showing display contents of a display section of the photographic color temperature meter.
Figure 12:
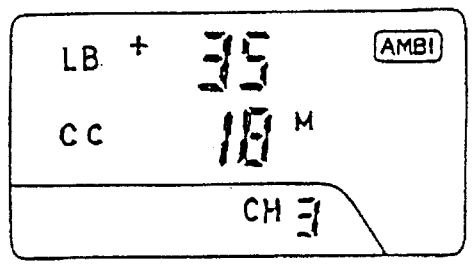
Figure 12:
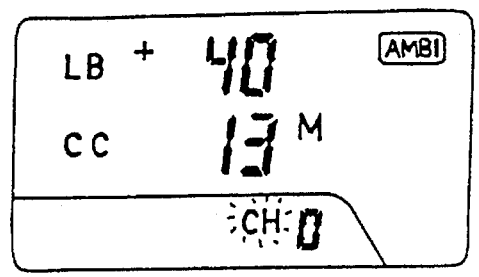
Figure 12:
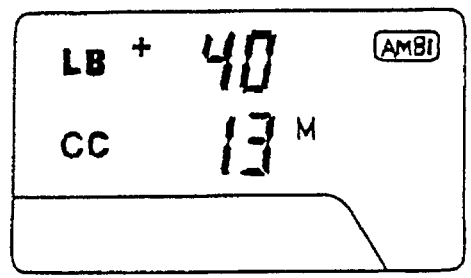
Figure 12:
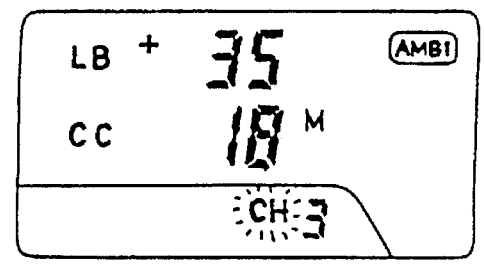

Then, a procedure of selecting the memory channel will be explained, referring to FIGS. 11 and 12a–12e. FIG. 11 is a flow chart showing a procedure of selecting the memory channel, and FIG. 12(a)–FIG. 12(e) show the contents indicated on the display unit 55. FIG. 12(a) is a case that the memory channel 0 for indicating the measured value itself Is set, and it is indicated that LB=+40 mired, CC=13M in this example. Further, the display of "AMBI" indicates the contents selected by the light measurement mode change over switch 52.

Firstly, when the memory channel change over key 56 is depressed (YES at #51), memory channel selecting mode is set, and characters of CH blinks, which is indicated on the display unit 55 as shown in FIG. 12(b), to show that change of memory channel is possible (#52). Then, if the UP key 54 is depressed under the condition that the memory channel change over key 56 is depressed (YES both at #53 and #54), in case memory channel is not 4 (NO at #55), 1 is added to a set memory channel (#56), the process advancing to a processing of indication of LB and CC (#60, #61). On the other hand, if the DOWN key 54 is depressed under the condition that the memory channel change over key 56 is depressed (YES both at #53 and #57), in case the memory channel is not 0 (NO at #58), 1 is subtracted from the set memory channel (#59), and the process advances to the processing of indication of LB and CC (#60, #61).

If a memory channel number becomes 4, even if keeping depressing the memory channel change over key 56 and the UP key 54 continuously, a value above this can not be set. Also, if the memory channel number becomes 0, even if keeping depressing the memory channel change over key 56 and the DOWN key 54 continuously, a value below this can not be set.

In the process hereinbefore, the display value of LB and CC is calculated (#60) and indicated (#61) on the basis of correction value Δ LB and Δ CC corresponding to added or subtracted memory channel. Thereafter, after waiting a predetermined time (#62), the process returns again to the judgment whether the memory channel change over key 56 is depressed or not (#53). While the memory channel change over key 56 keeps being depressed (YES at #53), the memory channel is indicated in the state of being added or subtracted the same times as the UP or DOWN key 54 is depressed. For example, in case that 0 is set to the memory channel and the UP key 54 is depressed three times, the memory channel is set with 3 added thereto, and as shown in FIG. 12(c), it is indicated that LB=+35 mired, CC=18M based on the data that the correction value Δ LB=−5 mired, Δ CC=5M corresponding to memory channel 3. Also, if the UP key or DOWN key 54 continues to be depressed while the memory channel change over key 86 keeps being depressed (YES at #53), the memory channel is added or subtracted every time the time as long as waiting time at #62 has lapsed, and the indication changes in response to the correction value of the memory channel.

When a desired memory channel is obtained and the memory channel change over key 56 is detached (NO at #53), the setting of memory channel selecting mode is removed, and blink of the characters CH which has so far blinked stops as shown in FIG. 12(d), thereby indicating that processing for selecting memory channel is completed (#63). Meanwhile, in case that the memory channel is set to 0, "CH0" indicated on the display unit 55 may be put out as shown in FIG. 12(e).

Figure 13:
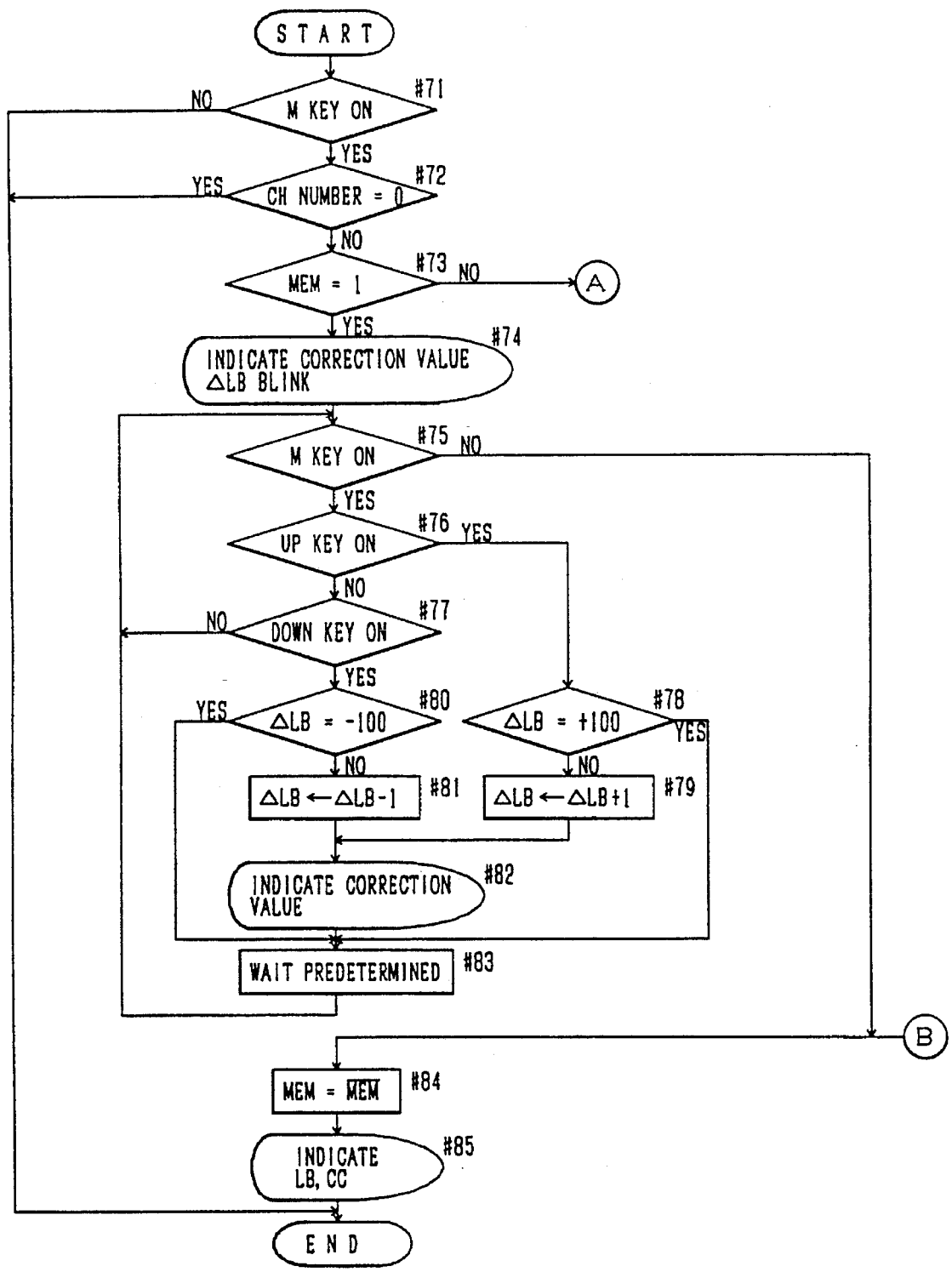
FIG. 13 is a flow chart showing a procedure for changing a correction value of the memory channel.
Figure 14:
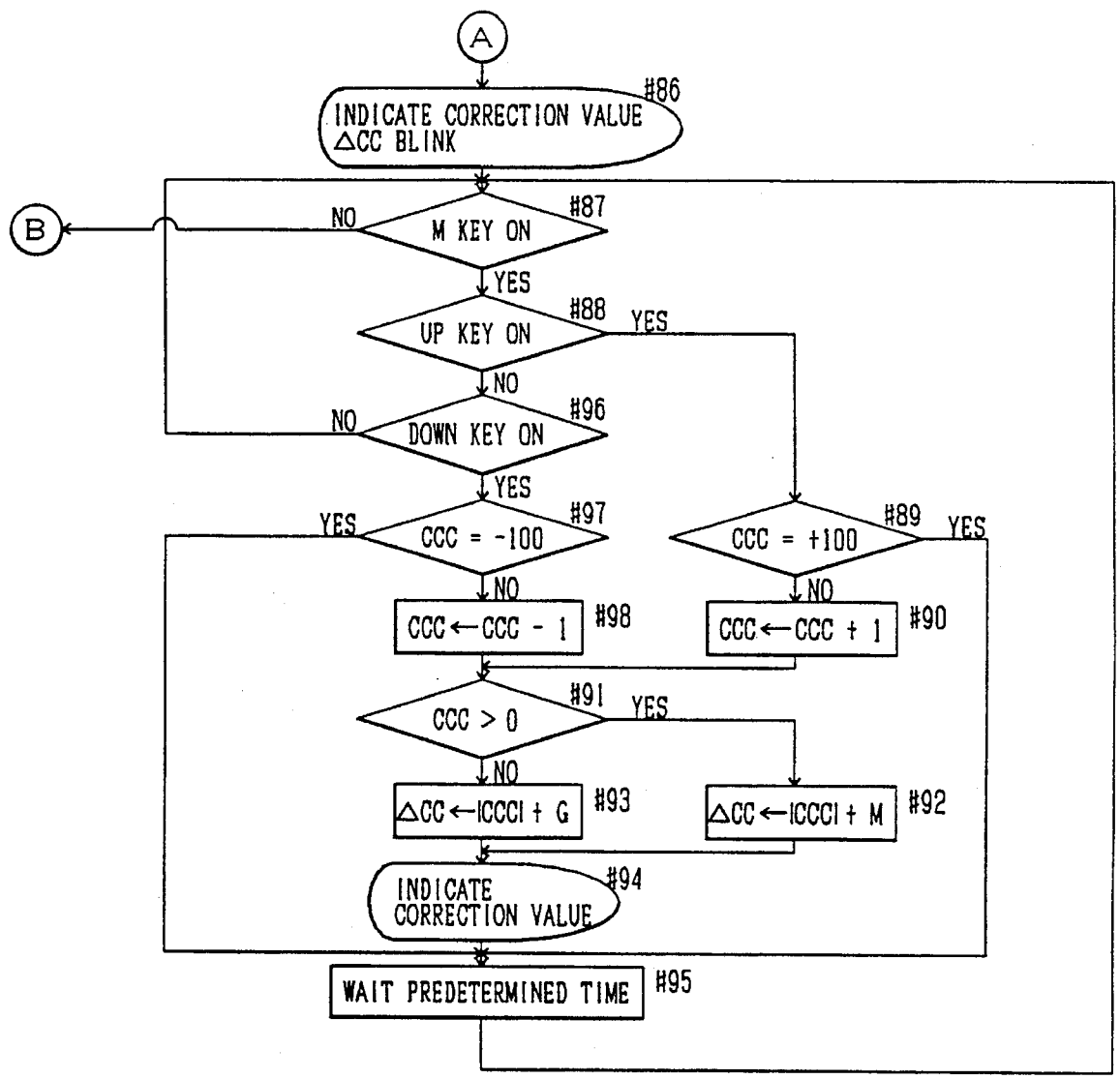
FIG. 14 is a flow chart showing a procedure for changing the correction value of the memory channel.
Figure 15:
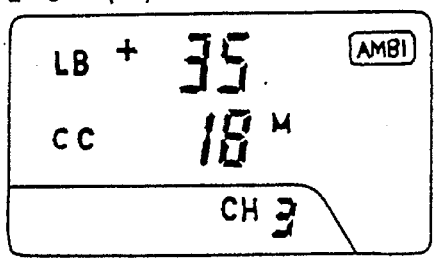
FIGS. 15a–15g are views showing display contents of the display section of the photographic color temperature meter.
Figure 15:
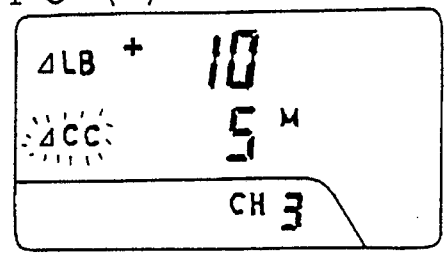
Figure 15:
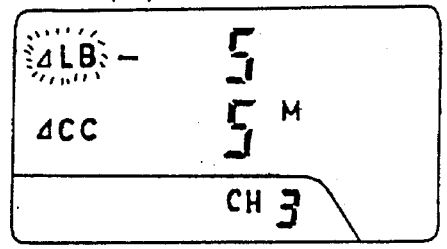
Figure 15:
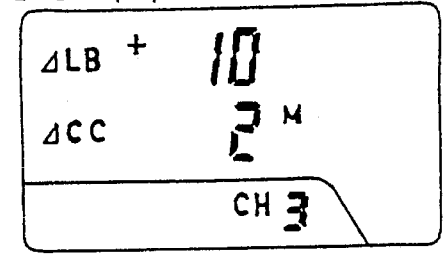
Figure 15:
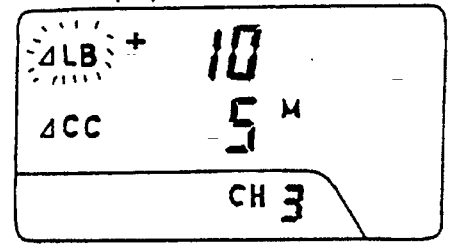
Figure 15:
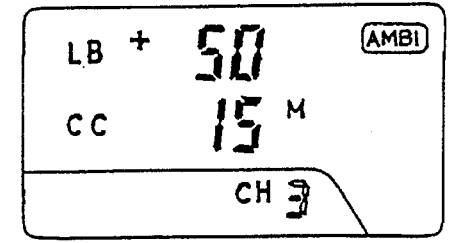
Figure 15:
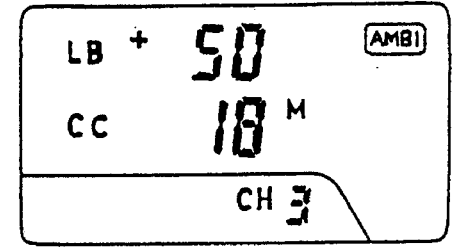

Explained next is a procedure of changing the correction value of the memory channel, with reference to FIGS. 13, 14 and 15a–15g. FIGS. 13 and 14 are flow charts showing the procedure of changing the correction value of the memory channel. FIGS. 15(a)–(g) show the contents indicated on the display unit 55. FIG. 15(a) shows the contents to be set in the memory channel 3, "LB=+35", "CC=18M" being indicated in this example.

When a memory key 57 is depressed (YES at #71), the LB correction value and CC correction value changing mode is set. If the memory channel is not 0 (NO at #72), a processing for changing correction value is carried out. A flag for judging whether a correction value to be changed is LB or CC has been memorized on memory MEM of the photographic color temperature meter. In case of MEM being 1, LB value changeable condition is indicated (#74). In case of MEM being 0, CC value changeable condition is indicated (#86).

In case MEM being 1 (YES at #73), the procedure enters into a processing for changing correction value of LB. At this point, as shown in FIG. 15(b), correction values Δ LB=−5 mired, ΔCC=5M, which are set in the memory channel 3 that are indicated. The indication of Δ LB is blinked and "AMBI" is put out.

When the UP key 54 is depressed under the condition that the memory key 57 is depressed (YES both at #75 and #76), in case Δ LB is not +100 (NO at #78), 1 is added to the set correction value Δ LB (#79), and a newly set correction value is indicated (#82), the procedure waits for a predetermined time (#83). While, the DOWN key is depressed under the condition that the memory key 57 is depressed (YES both at #75 and #77), Δ LB is set −100 (NO at #80), 1 is subtracted from the set correction value Δ LB (#81), and the procedure goes to the step #82. However, when Δ LB becomes +100, a value above this can not be set even if depressing repeatedly the memory key 57 and the UP key 54. Also, when Δ LB becomes −100, a value below this can not be set even if depressing repeatedly the memory key 57 and the UP key 54.

After waiting for the predetermined time (#83), returning to the processing #75, it is Judged again whether the memory key 57 is depressed or not. Under the condition that the memory key 57 is being depressed (YES at #75), Δ LB is indicated, added or subtracted the same times as the UP or DOWN key 54 is depressed. Also, if the UP or DOWN key 54 is depressed repeatedly while the memory key 57 keeps being depressed (YES at #75), Δ LB is indicated, added or subtracted every time the waiting time at #83 has elapsed.

If the memory key 57 is detached when becoming a desired correction value (NO at #75), the setting of LB correction value and CC correction value changing mode is removed, MEM is rendered 0, and thereafter the correction value of CC is rendered changeable (#84). Further in succession, LB display value and CC display value are calculated based on the newly set LB correction value and CC correction value and indicated (#85), thus the processing for changing correction value is completed.

An example of indication according to the above processing will be shown. If the UP key 54 is depressed 15 times or continues to be depressed while the memory key 57 is kept being depressed, "Δ LB+10" is indicated on the display unit 55 as shown in FIG. 15(c). Thereafter, when the memory key 57 is detached, a display value corresponding to the newly set correction value Δ LB=+10 mired, Δ CC=5M is calculated. As shown in FIG. 15(d), "LB+50" and "CC18M" is indicated on the display unit 55. "AMBI" is also indicated again because LB value and CC value changing mode is removed.

On the other hand, in case that the memory key 57 is depressed (YES at #71) and MEM is 0 (NO at #73), the procedure enters into a processing for changing the correction value of CC as shown in the flow chart in FIG. 14. At this point, as shown in FIG. 15(e), "Δ LB+10" and "Δ CC5M" is indicated on the display unit 55, and the characters of "Δ CC" blinks to show that the correction value of CC is changeable (#86). The indication of "AMBI" is put out since the LB value and CC value changing mode is set. Meanwhile, CCC is provided in this photographic color temperature meter as a memory for calculating Δ CC. An absolute value of CCC is equal to the value of Δ CC. In case that CCC is a positive, M is appended to the value of Δ CC. In case that CCC is a negative, G is appended to the value of Δ CC.

Consequently, if the UP key 54 is depressed while the memory key 57 is being depressed (YES both at #87 and #88), in case that CCC is not +100 (NO at #89), 1 is added to a set CCC (#90). A sign of CCC is Judged before indicating correction value. When the CCC is a positive (YES at #91), a display value of Δ CC is M and the absolute value of CCC (#92). When CCC is not a positive (NO at #91), the display value of Δ CC is G and the absolute value of CCC (#93). Thereafter, a correction value newly set is indicated (#94), and the process waits for a predetermined time (#95).

Also, if the DOWN key 54 is depressed while the memory key 57 is being depressed (YES both at #87 and #96), in case that CCC is not −100 (NO at #97), 1 is subtracted from the set CCC (#98). After the processing in accordance with the plus minus sign of CCC similarly to the above, a correction value newly set is indicated (#94) and the process waits for the predetermined time (#95). However, if CCC becomes +100, a value greater than this can not be set even if the memory key 57 and the UP key 54 are depressed repeatedly. Also, if CCC becomes −100, a value less than this can not be set even if the memory key 57 and the DOWN key 54 are depressed repeatedly.

After waiting for the predetermined time (#95), the processing returns to #87 to judge again whether the memory key 57 has been depressed or not. While the memory key 57 remains depressed (YES at #87), CCC is indicated as added or subtracted the same times as the UP or DOWN key 54 is depressed. Also, if the UP or DOWN key 54 continues to be depressed while the memory key 57 remains depressed (YES at #87), CCC is added or subtracted every time the time as long as waiting time at #95 has elapsed.

When a desired correction value is obtained and the memory key 57 is detached (NO at #87), the setting of LB correction value and CC correction value changing mode is removed, MEM is rendered 1, and thereafter the correction value of CC is rendered changeable (#84). Consequently, LB display value and CC display value are calculated and indicated (#85) similarly to the abovementioned processing for changing LB correction value. Thus the processing for changing correction value is completed.

An example of indication according to the processing described hereinbefore will be shown. When the DOWN key 54 is depressed 3 times while the memory key 57 remains depressed, "Δ CC2M" is indicated on the display unit 55 as shown in FIG. 15(f). Thereafter, when the memory key 57 is detached, the display value corresponding to newly set correction value Δ LB=+10 mired, Δ CC=2M is calculated, and "LB+50","CC15M" is displayed on the display unit 55 as shown in FIG. 15(g). Also, "AMBI" is indicated again since the setting of LB value and CC value changing mode is removed.

Although the correction value of LB is set separately from that of CC in this second embodiment, it is possible to set the correction value of LB and that of CC at the same time after depressing the memory key 57, by improving operational construction.

Figure 16:
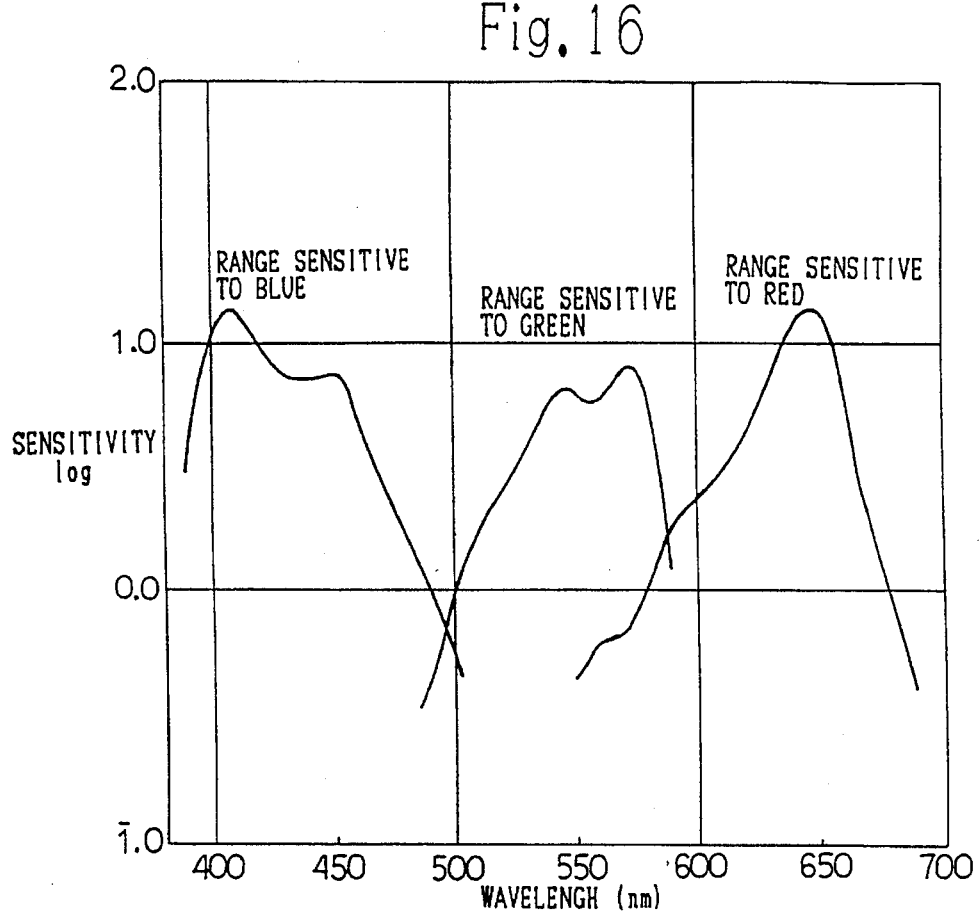
FIG. 16 is a graph showing an example of a spectral sensitivity of a film.
Figure 17:
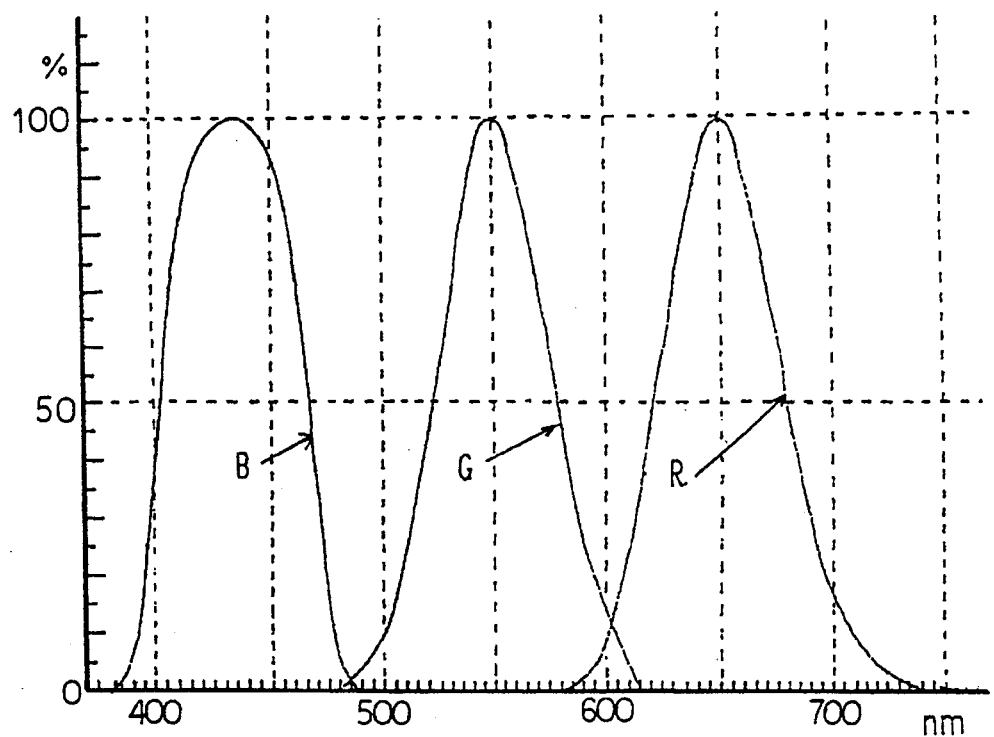
FIG. 17 is a graph showing an example of a spectral sensitivity of the photographic color temperature meter.

A third embodiment will be explained next with reference to FIGS. 16–18. This third embodiment describes a photographic color temperature meter provided with illuminance measuring function. An illuminance measuring function is provided in the photographic color temperature meter for use when it is required to measure illuminance in phototaking operation. FIG. 16 shows an example of spectral sensitivity of film. FIG. 17 shows an example of spectral sensitivity of the photographic color temperature meter. Since the spectral sensitivity of a sensor of the photographic color temperature meter is required to approximate to that of film, a curve of the FIG. 17 resembles that of the FIG. 16.

Figure 18:
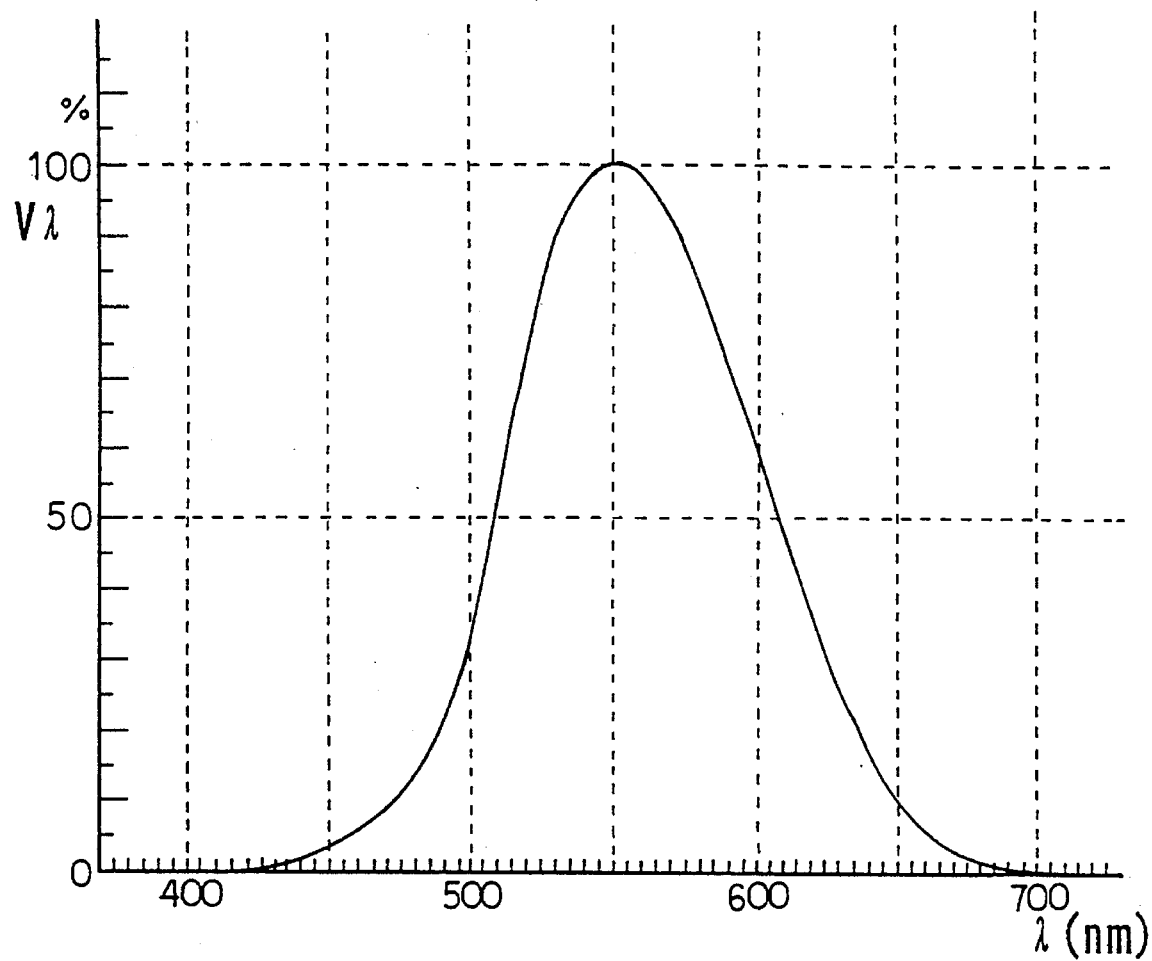
FIG. 18 is a graph of a curve showing a spectral luminous efficiency for an individual observer.

FIG. 18 shows a curve $V\lambda$ representing a spectral luminous efficiency for an individual observer: in a range of wavelength (380 mm–780 mm) wherein a person senses light, assuming that a sensitivity at wavelength 555 mm having maximum sensitivity is 100% as a standard value, a sensitivity % of each wave length is expressed. In case of using a sensor output of the photographic color temperature meter for illuminance measurement, the spectral sensitivity of the sensor of the photographic color temperature meter has to be a spectral luminous efficiency curve $V\lambda$ in accordance with the wavelength sensible for a person. However, even a spectral sensitivity of green of the sensor differs remarkably from the spectral luminous efficiency curve $V\lambda$.

Accordingly, in case of using a sensor output of spectral sensitivity of green for illuminance measurement, although correct illuminance value is obtained at a modified light source, an error is large when measuring illuminance at a light source having color temperature different from that of modified light source. Conventionally, as a countermeasure, a sensor only for use in luminance measurement and having spectral luminous efficiency curve $V\lambda$ is used, however, it requires addition of this sensor and accompanying parts, resulting in increasing cost and making the apparatus bulky and complicated.

Therefore, in this photographic color temperature meter, as shown in below equation 7, illuminance correction value K1, K2, K3 of a sensor output of blue, green and red spectral sensitivity is obtained under 3 kinds of light source being different in color temperature. Next, as shown in below equation 8, illuminance EN obtained by an arbitrary light source PN ($\lambda$) is calculated from this illuminance correction value K1, K2, K3. Thus, in case of measuring illuminance under the light source with its color temperature different from that of modified light source, the error of illuminance can be made smaller, if obtained with use of the above equations than obtained only from the sensor output of green spectral sensitivity.

$$\begin{vmatrix} E1 \\ E2 \\ E3 \end{vmatrix} = \quad (7)$$

-continued $$\begin{vmatrix} \int PT1(\lambda) \cdot b(\lambda)d\lambda & \int PT1(\lambda) \cdot g(\lambda)d\lambda & \int PT1(\lambda) \cdot r(\lambda)d\lambda \\ \int PT2(\lambda) \cdot b(\lambda)d\lambda & \int PT2(\lambda) \cdot g(\lambda)d\lambda & \int PT2(\lambda) \cdot r(\lambda)d\lambda \\ \int PT3(\lambda) \cdot b(\lambda)d\lambda & \int PT3(\lambda) \cdot g(\lambda)d\lambda & \int PT3(\lambda) \cdot r(\lambda)d\lambda \end{vmatrix} \begin{vmatrix} K1 \\ K2 \\ K3 \end{vmatrix}$$

Here, $b(\lambda)$, $g(\lambda)$ and $r(\lambda)$ stand for the spectral sensitivity of photographic color temperature meter sensor.

E1 is an illuminance value by a light source $PT1(\lambda)$ of color temperature T1. E2 is an illuminance value by a light source $PT2(\lambda)$ of color temperature T2. E3 is an illuminance value by a light source $PT3(\lambda)$ of color temperature T3. $T1 \neq T2 \neq T3$.

K1, K2 and K3 are a constant obtained previously and memorized in the photographic color temperature meter.

For instances, $\int PT1(\lambda) \cdot b(\lambda)d\lambda$ is a sensor output of blue spectral sensitivity when measured illuminance under the light source PT1 of color temperature T1.

$$EN=K1 \int PN(\lambda) \cdot b(\lambda)d\lambda + K2 \int PN(\lambda) \cdot g(\lambda)d\lambda + K3 \int PN(\lambda) \cdot r(\lambda)d\lambda \quad (8)$$

For instances, $\int PN(\lambda) \cdot b(\lambda)d\lambda$ is a sensor output of blue spectral sensitivity.

As is apparent from the description hereinbefore, according to the present invention, it is possible to obtain color temperature only of flash light with no influence of stationary light, since it is arranged that the data corresponding to flash light is calculated based on light measurement data, the color temperature only of flash light is obtained by calculation from this data and the color temperature data is output. Accordingly, there is no necessity for turning the ambience completely dark before phototaking operation, improving an operational efficiency of light measurement. In particular, under the conditions difficult to remove stationary light, such as outdoors, it allows simple and easy operation to measure color temperature only of flash light and easy control of the color temperature.

The present invention has fully been described by way of example referring to accompanying drawings, it is to be noted that various changes and modifications are apparent to those skilled in the art and can be made without departing from the spirit and scope of the invention.

What is claimed is:

1. A photographic color temperature meter capable of measuring light composed of stationary light and flash light, comprising:

light receiving means for receiving the light to be measured which is composed of the stationary light and flash light and for separating the measured light into color components, whereby signals corresponding to each of the color components are output;

calculating means for calculating color temperature only of the flash light, which makes up the measured light together with the stationary light,, based on the output signals from the light receiving means; and control means for controlling timing of the light measurement so that the light receiving means performs the light measurement during a time period when the stationary light is included.

2. A photographic color temperature meter capable of measuring light composed of stationary light and flash light, comprising:

light receiving means for receiving incident light and separating the incident light into color components, whereby signals corresponding to each of the color components are output;

first light measuring means for performing light measurement at the same time with flash light emission, whereby first light measurement data including the stationary light and flash light is obtained based on the output signals from the light receiving means;

second light measuring means for performing light measurement while the flash light is not emitted, whereby second light measurement data including only the stationary light and not including the flash light is obtained based on the output signal from the light receiving means;

calculating means for calculating color temperature only of the flash light including no stationary light based on the first light measurement data and the second light measurement data; and output means for outputting color temperature data only of the flash light calculated by the calculating means.

3. A photographic color temperature meter capable of measuring light composed of stationary light and flash light, comprising:

light receiving means for receiving the light to be measured;

first calculating means for calculating color temperature of the measured light composed of the stationary light and flash light based on the output signals from the light receiving means;

second calculating means for calculating color temperature only of the flash light, which makes up the measured light together with the stationary light, based on the output signals from the light receiving means;

an operational member to be operated manually by an operator;

exposure time selecting means for selecting an exposure time by manual operation of the operational member; and mode setting means for setting selectively a first mode to calculate color temperature of the measured light including the stationary light and flash light or a second mode to calculate color temperature only of the flash light included within the measured light, wherein mode setting is performed by manual operation of the operational member used for the selection of exposure time.

4. A photographic color temperature meter as claimed in claim 3, wherein the operational member has a range of plural options for the exposure time and an option for setting the second mode which is disposed at either of two ends of the range of plural options for the exposure time; and the mode setting means sets the first mode in the case where one of the options for the exposure time is selected by the operational member, and sets the second mode in the case where the option for setting the second mode is selected.

5. A photographic color temperature meter as claimed in claim 4, wherein the plural options for exposure time are arranged over said range in order from a relatively short time to a relatively long time, and the option for setting the second mode is located at the end of said range adjacent said relatively short time.

6. A photographic color temperature meter as claimed in claim 5, wherein the operational member is an up or down key.

7. A photographic color temperature meter capable of measuring light composed of stationary light and flash light: comprising:

light receiving means for receiving the light to be measured which is composed of the stationary light and flash light and for separating the measured light into color components, whereby signals corresponding to each of the color components are output;

first setting means for setting an exposure time before light measurement is started;

calculating means for calculating color temperature of measured light incident during the set exposure time based on an output from the light receiving means;

second setting means for setting a newly desired exposure time by manual operation after the light measurement; and convening means for converting the color temperature calculated by the calculating means into the color temperature of measured light incident during the exposure time set by the second setting means.

8. A photographic color temperature meter comprising:

light receiving means for receiving light to be measured, whereby the light is separated into color components and signals of each color component are output;

calculating means for calculating a light-balancing micro-reciprocal degree value and a color-compensating density value of a filter for correcting a difference between a color temperature of a light source specified according to a color balance characteristic of a film and a color temperature of the measured light;

input means for inputting a correction amount of the light-balancing micro-reciprocal degree value and the color-compensating density value which an operator desires; and correcting means for correcting the light-balancing micro-reciprocal degree value calculated by the calculating means based on the correction amount inputted by the input means.

9. A photographic color temperature meter as claimed in claim 8 further including a plurality of channels, wherein the input means is capable of inputting in respective channels the correction amount which the operator desires.

10. A photographic color temperature meter as claimed in claim 8, further comprising:

a first channel wherein the correction amount of the light-balancing micro-reciprocal degree value and the color-compensating density value are fixed in a predetermined amount;

a second channel wherein the correction amount of the light-balancing micro-reciprocal degree value and the color-compensating density value can be input by the input means; and channel selecting means for selecting either the first channel or the second channel.

11. A light measuring device capable of measuring light composed of stationary light and flash light, comprising:

light receiving means for receiving the light to be measured which is composed of the stationary light and flash light and for separating the measured light into color components, whereby signals corresponding to each of the color components are output; and calculating means for calculating color only of the flash light, which makes up the measured light together with the stationary light, based on the output signals from the light receiving means.

12. A light measuring device capable of measuring light composed of stationary light and flash light, comprising:

light receiving means for receiving incident light and separating the incident light into color components, whereby signals corresponding to each of the color components are output;

control means for controlling timing of the light measurement so that the light receiving means performs light measurement during a time period when the stationary light and flash light are included and when only the stationary light is included; and calculating means for calculating color only of the flash light, which makes up the measured light together with the stationary light, based on the output signals from said light receiving means.

13. A light measuring device as claimed in claim 12, wherein the light receiving means includes a plurality of light receiving units each having different spectral sensitivity.

* * * * *